United States Patent
Visser et al.

(10) Patent No.: US 8,477,464 B2
(45) Date of Patent: Jul. 2, 2013

(54) ELECTRONIC DEVICE WITH A VARIABLE ANGULATION OF A FLEXIBLE DISPLAY

(75) Inventors: Hendrik Dirk Visser, Eindhoven (NL); Michael Johannes Anna Maria Walters, Eindhoven (NL); David Johannes Elisabeth Bemelmans, Eindhoven (NL)

(73) Assignee: Creator Technology B.V., Breda (NL)

( * ) Notice: Subject to any disclaimer, the term of this patent is extended or adjusted under 35 U.S.C. 154(b) by 483 days.

(21) Appl. No.: 12/664,805

(22) PCT Filed: Jun. 16, 2008

(86) PCT No.: PCT/NL2008/050389
§ 371 (c)(1),
(2), (4) Date: Apr. 27, 2010

(87) PCT Pub. No.: WO2008/153402
PCT Pub. Date: Dec. 18, 2008

(65) Prior Publication Data
US 2010/0208417 A1    Aug. 19, 2010

Related U.S. Application Data

(60) Provisional application No. 60/944,346, filed on Jun. 15, 2007.

(51) Int. Cl.
*G06F 1/16* (2006.01)

(52) U.S. Cl.
USPC ............. 361/21; 361/679.3; 361/679.55; 361/679.56; 349/84; 340/815.83

(58) Field of Classification Search
USPC ................................. 361/679.05, 679.27
See application file for complete search history.

(56) References Cited

U.S. PATENT DOCUMENTS

| 5,548,478 | A  | * | 8/1996  | Kumar et al.    | 361/679.27 |
| 5,768,096 | A  | * | 6/1998  | Williams et al. | 361/679.04 |
| 6,016,176 | A  | * | 1/2000  | Kim et al.      | 349/84     |
| 6,311,076 | B1 | * | 10/2001 | Peuhu et al.    | 455/566    |
| 6,466,369 | B1 | * | 10/2002 | Maddock         | 359/460    |
| 6,510,588 | B2 | * | 1/2003  | Eromaki         | 16/308     |
| 6,539,208 | B1 | * | 3/2003  | Mori            | 455/575.3  |
| 6,542,721 | B2 | * | 4/2003  | Boesen          | 455/553.1  |

(Continued)

FOREIGN PATENT DOCUMENTS

EP    1 635 313 A    3/2006
WO   WO 2004/114259 A   12/2004

OTHER PUBLICATIONS

International Search Report dated Mar. 13, 2009 for PCT/NL2008/050389.

(Continued)

*Primary Examiner* — Anthony Q Edwards

(57) ABSTRACT

An electronic device is disclosed that comprises a housing 81 and a flexible display, which may have respective portions 82a, 82b, 82c and 82d. The portions may be accommodated between respective hinges 84a, 84b, 84c, 84d, which are arranged as a mechanism for enabling a transition between the first mechanically stable position and a second mechanically stable position. The display is viewed from a direction 85. The hinges are operated independently from each other, enabling a plurality of angulations of the flexible display with respect to the housing 81.

10 Claims, 14 Drawing Sheets

U.S. PATENT DOCUMENTS

| | | | |
|---|---|---|---|
| 6,772,479 B2 * | 8/2004 | Hinkley et al. | 16/225 |
| 6,816,363 B2 * | 11/2004 | Yamamoto | 361/679.3 |
| 7,027,110 B2 * | 4/2006 | Akiyama et al. | 349/58 |
| 7,095,387 B2 * | 8/2006 | Lee et al. | 345/4 |
| 7,180,665 B2 * | 2/2007 | Daniel et al. | 359/461 |
| 7,463,238 B2 * | 12/2008 | Funkhouser et al. | 345/107 |
| 7,558,057 B1 * | 7/2009 | Naksen et al. | 361/679.56 |
| 7,641,159 B2 * | 1/2010 | Kim | 248/176.3 |
| 7,725,988 B2 * | 6/2010 | Kim et al. | 16/361 |
| 8,035,577 B2 * | 10/2011 | Lafarre et al. | 345/55 |
| 8,064,962 B2 * | 11/2011 | Wilcox et al. | 455/566 |
| 8,151,501 B2 * | 4/2012 | Bemelmans et al. | 40/610 |
| 8,190,219 B2 * | 5/2012 | Park et al. | 455/575.4 |
| 2002/0069483 A1 * | 6/2002 | Savolainen et al. | 16/308 |
| 2003/0048256 A1 * | 3/2003 | Salmon | 345/168 |
| 2004/0052037 A1 * | 3/2004 | Sawyer | 361/681 |
| 2004/0061683 A1 * | 4/2004 | Mochizuki et al. | 345/168 |
| 2005/0146498 A1 * | 7/2005 | Hemia et al. | 345/156 |
| 2006/0038745 A1 * | 2/2006 | Naksen et al. | 345/30 |
| 2006/0050169 A1 * | 3/2006 | Misawa | 348/333.06 |
| 2006/0146488 A1 * | 7/2006 | Kimmel | 361/681 |
| 2006/0166713 A1 * | 7/2006 | Yeh et al. | 455/575.1 |
| 2006/0192726 A1 * | 8/2006 | Huitema et al. | 345/1.1 |
| 2006/0293094 A1 * | 12/2006 | Kilpi et al. | 455/575.3 |
| 2007/0067954 A1 * | 3/2007 | Finney et al. | 16/235 |
| 2007/0097014 A1 * | 5/2007 | Solomon et al. | 345/1.1 |
| 2007/0105606 A1 * | 5/2007 | Yoon et al. | 455/575.4 |
| 2007/0241002 A1 * | 10/2007 | Wu et al. | 206/150 |
| 2008/0049003 A1 * | 2/2008 | Hasegawa | 345/206 |
| 2008/0081505 A1 * | 4/2008 | Ou et al. | 439/374 |
| 2008/0144265 A1 * | 6/2008 | Aoki | 361/681 |
| 2008/0158795 A1 * | 7/2008 | Aoki et al. | 361/681 |
| 2008/0189908 A1 * | 8/2008 | Lowry et al. | 16/231 |
| 2008/0196201 A1 * | 8/2008 | Anderson | 16/232 |
| 2008/0204367 A1 * | 8/2008 | Lafarre et al. | 345/55 |
| 2009/0073084 A1 * | 3/2009 | Mullen | 345/8 |
| 2010/0037428 A1 * | 2/2010 | Gaddy | 16/223 |

OTHER PUBLICATIONS

Japan Patent Office, Office Action, Patent Application Serial No. 2010-512101, Oct. 30, 2012, Japan.

* cited by examiner

ELECTRONIC DEVICE WITH A VARIABLE ANGULATION OF A FLEXIBLE DISPLAY

FIELD OF THE INVENTION

The invention generally relates to a device comprising a housing, a flexible display adapted to be displaced with respect to the housing, wherein the flexible display includes a first mechanically stable position and a second mechanically stable position, and a mechanism arranged for enabling at least a transition between the first mechanically stable position and the second mechanically stable position.

BACKGROUND OF THE INVENTION

An embodiment of a device described herein above is known from WO2004/114259 A2. The known device comprises a display device having an extendible, notably flexible, display which is accommodated in a suitable housing. For example, the display may be rolled about a suitable roller arranged in the housing. The housing of the known device is suitably formed to allow an extension of the display from the housing. It is envisaged that the display can be accommodated in a first mechanically stable position, notably a storage position, and in a second mechanically stable position, notably a viewing position. In a particular embodiment of the known device the housing is arranged with a mechanism, notably an X-frame, for enabling a transition between the first mechanically stable position and the second mechanically stable position.

SUMMARY OF THE INVENTION

It is a disadvantage of the known device that the known mechanism provides limited user interface options. In addition, due to its construction the known mechanism may introduce a non-allowable mechanical shock to the display which may cause damage to its fragile components.

It is an object of the invention to provide a device as is set forth in the opening paragraph wherein a plurality of user interface options is enabled.

To this end in the device according to the invention said first mechanically stable position and said second mechanically stable position are enabled for different angulations of the flexible display or portions of the flexible display with respect to the housing.

It is found to be particularly advantageous to provide the device wherein different mutual angulations between the flexible display and the housing of the electronic device enable suitable user interface options. For example, it is found to be convenient to allow the flexible display to be fixed at different angulations with respect to the housing, whereby the user may choose to view the display, to partially view the display, to use the display for inputting data in a touch-sensitive mode, etc. Preferably, the first mechanically stable position corresponds to a first viewing position and the second mechanically stable position corresponds to a second viewing position. The first viewing position may also correspond to a configuration, wherein an angulation of a portion of the flexible display with respect to the housing is different with respect to the second viewing position. Due to this feature suitable mechanically stable configuration of the flexible display in three-dimensional space can easily be enabled, whereby, for example, for each separate three-dimensional configuration one or more specific user options are enabled.

For example, it is possible that when a portion of the flexible display is suitably arranged with respect to the housing, the user may be allowed to check status of the electronic device, like battery charge, missed calls status, incoming messages or e-mail, etc. When a greater area of the flexible display can be viewed, the user may be allowed to input data using touch sensitive functionality of the flexible display. It is also possible that suitable arrangement of icons of the user interface of the electronic device on the viewed portion of the flexible display is dependent on the area of the viewed portion of the flexible display. For example, the electronic device may comprise sensors, preferably cooperating with mechanics of the first mechanically stable position and the second mechanically stable position for detecting which portion of the full area of the flexible display is used. The icons as well as selection of the icons may be displayed on the said portion in dependence of the area of the flexible display which is being in use. For example, for small portions, such as about 20% of the full area, only status icons are displayed. For larger areas, for example, more than 50% of the full area, substantially all functional icons are potentially projected. It is further possible that a dimension of an icon depends on the viewing area of the flexible display.

By way of example, the mechanism for enabling the transition between the first mechanically stable position and the second mechanically stable position is arranged to cooperate with an elastic locking unit. This technical measure is based on an insight that the elastic material has a property of shock damping. By ensuring a suitable cooperation of the mechanism arranged for enabling at least a transition between said first mechanically stable position and said second mechanically stable position and the elastic locking unit, preferably arranged for fixing the mechanism in the first mechanically stable position or the second mechanically stable position, mechanical shock induced to a surface of the flexible display upon the said locking is prevented. This ensures an increased durability of the flexible display.

In an embodiment of the device according to the invention the mechanism comprises a bi-stable or a multi-stable arrangement. The bi-stable arrangement should be understood as a structure having two mechanically stable states. The multi-stable arrangement should be understood as a structure having two or more mechanically stable states. Suitable materials or constructions are potentially selected for this purpose. An embodiment of a suitable construction is an X-frame. It is found to be advantageous to incorporate the bi-stable or a multi-stable arrangement in the device according to the invention as it decreases the risk of damage of fragile components of the device during the transition between the first mechanically stable state and the second mechanically stable state.

In a further embodiment of the device according to the invention the mechanism comprises a module for driving the displaceable parts from an intermediate position between the first mechanically stable position and the second mechanically stable position towards the first mechanically stable position or the second mechanically stable position.

Due to this feature, extra force is applied to the mechanism during the above-mentioned transition between stable positions, said force enabling at least partial auto-transition in the direction between the first mechanically stable position and the second mechanically stable position. The auto-transition ensures that the locked parts are unlocked in a substantially smooth way, which improves the user friendliness of the device. In addition, this feature reduces a mechanical shock to the flexible display, thereby improving durability of the device.

Preferably, the module is arranged to store energy when the flexible display is at least in the first mechanically stable position or in the second mechanically stable position and to release energy when the flexible display is moving towards the first mechanically stable position or the second mechanically stable position. More preferably, the module is arranged to store potential energy. Suitable examples of the said module comprise a deformable element arranged to store elastic energy. For example, a spring may be used for the deformable element. Preferably, the flexible display comprises displaceable parts which are slidably arranged with respect to each other using a frame, the module comprising a tension spring cooperating with the mechanism.

In a still further embodiment of the device according to the invention the flexible display is arranged to be unfolded, the module being arranged to release energy substantially parallel to an unfolding direction.

According to this technical measure the auto-unfolding of the flexible display is enabled which improves user friendliness of the device as it may be unfolded by using one hand only. In addition, possible mechanical shock to the components of the flexible display is counteracted due to this feature.

In a still further embodiment of the device according to the invention the flexible display is arranged to be pivoted with respect to the housing, said display or housing comprising a recess, the elastic locking unit comprising an elastic material arranged to be compressed at least to partially fill the recess.

This embodiment provides a simple and reliable user interface for arranging the flexible display in the first mechanically stable state and/or the second mechanically stable state. In a case where the first mechanically stable position refers to a first viewing position and the second mechanically stable position refers to a second viewing position, two recesses cooperating with two elastic locking units may be provided. Alternatively, the elastic locking unit is dimensioned or comprises respective portions to cooperate with said two recessed, thereby enabling different angulation of the flexible display (or portions thereof) with respect to the housing.

In a still further embodiment of the device according to the invention the flexible display is arranged to be pivoted about a shaft, the module being arranged with a spring cooperating with the shaft and being arranged to enable the said transition.

In this embodiment the spring cooperating with the shaft enables an auto-transition from one mechanically stable state to the other mechanically stable state. Therefore, the device can be operated by one hand, improving user interface options of the device. For example, the spring is arranged as a torsion spring. For example, when the torsion spring is being compressed for the first mechanically stable state, notably an open position of the displaceable parts, the spring is going to be relaxed when the displaceable parts are being transitioned towards the second mechanically stable state thereby providing an extra internal force to the mechanical components of the electronic device gently pushing them towards the second mechanically stable state. This feature in addition enables a substantially smooth movement of the flexible display, thereby reducing a risk of undesired and potentially harmful mechanical shocks to the flexible display.

The flexible display may be conceived to be moved between an at least partially retracted state and an at least partially extended state, said partially retracted state and said partially extended state being implemented either for the first mechanically stable position or for the second mechanically stable position, or for both. Alternatively, the first mechanically stable position and the second mechanically stable position may correspond to different angulations of the flexible display (as a whole or in part) with respect to the housing, thereby enabling different viewing positions. The viewing positions may enable respective full views. Suitable examples of electronic devices according to the invention are mobile phones, organizers, palmtop computers or the like. It is noted that such devices are preferably operated by one hand. By providing the device with means for enabling mechanically stable positions of the operational parts of the device in different angles or planes, viewing options of the user interface are substantially improved, which in turn provide additional possibilities to the user to interact with the device.

In addition, in cases where the device comprises a flexible electronic display, mechanical shock hazard is reduced. By providing solutions to this problem as is set forth in the foregoing an improved electronic device is provided.

These and other aspects of the invention will be discussed in more detail with reference to figures.

BRIEF DESCRIPTION OF THE FIGURES

FIG. 1b presents a further schematic view of the device of FIG. 1a;

FIG. 2b presents a further schematic view of the device of FIG. 2a;

DETAILED DESCRIPTION OF THE DRAWINGS

Figure 1A:
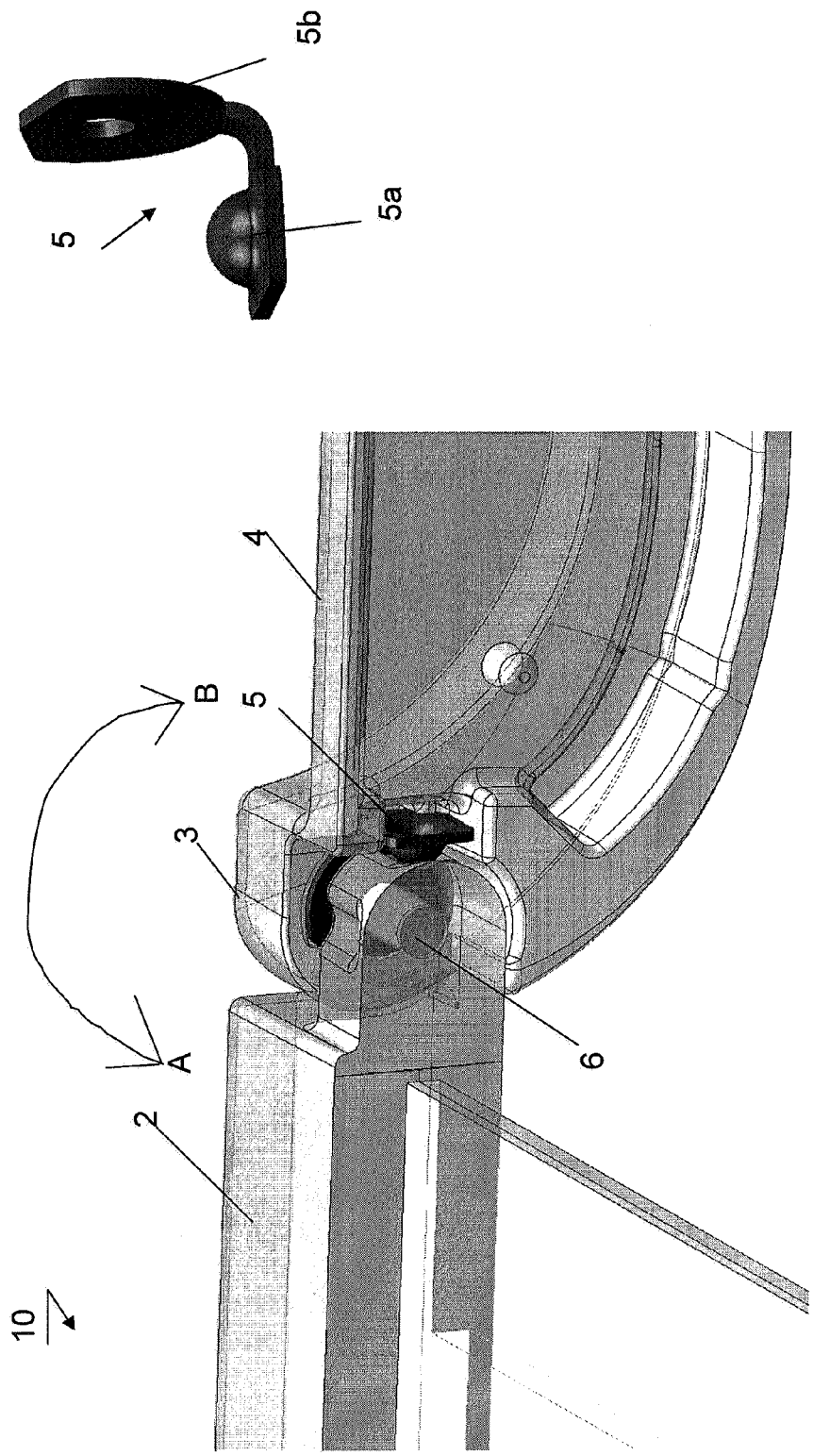
FIG. 1a presents a schematic view of an embodiment of the device according to the invention comprising an elastic locking unit.

FIG. 1a presents a schematic view of an embodiment of the device according to the invention comprising elastic locking unit. The electronic device 10 comprises two mutually displaceable parts 2, 4 adapted to be moved between a first mechanically stable position A and a second mechanically stable position B—a transition between these two positions being schematically indicated by an arrow. Part 2 may relate to a flexible display and part 4 may relate to a housing of the electronic device 10. The first mechanically stable position may correspond to an open state of the device 10, and the second mechanically stable position may correspond to a closed state of the device 10, or vice versa. Alternatively or additionally, the first mechanically stable position may correspond to a first viewing position, and the second mechanically stable position may correspond to a second viewing position. The first viewing position and the second viewing position may enable a partial or a full view.

The parts 2, 4 are preferably interconnected by a hinge 3 having a shaft 6 defining an axis of rotation. In accordance with an example of the invention the device 10 is provided with an elastic locking unit 5 arranged to enable a smooth transition between the first mechanically stable position A and the second mechanically stable position B. The hinge 3 serves as a mechanism for enabling a transition between the first mechanically stable position A and the second mechanically stable position B. The elastic locking unit 5 may be implemented by a suitable elastic material, for example metal, or the like, and may comprise a projection 5a conceived to cooperate with a recess 5b. In the right hand portion of FIG. 1a the locking unit 5 is schematically depicted in isolation, it being shown in an open position. By suitably selecting elastic properties of the elastic locking unit 5, a transition between the open position of the locking unit 5 and a closed position of the locking unit 5 is enabled under release of an elastic energy stored in the locking unit 5 when it is closed. For example, the material of the locking unit 5 has a relaxed condition corresponding to a minimum potential energy when the locking unit is in a first mechanically stable position (or, alternatively, when it is in a second mechanically stable position), so that a transition from a state storing the potential energy to a state with a minimum potential energy is enabled under release of said energy. In an embodiment where the first mechanically stable position and the second mechanically stable position correspond to a first and a second viewing position, respectively, the locking means 5 may have two projections of the type 5a cooperating with two recesses of the type 5b. By suitably orienting the locking unit 5 with respect to the hinge 3, such release of energy may be used to smoothly reach one of the mechanically stable positions from an intermediate position, thereby reducing risk of hazardous mechanical shock to the components of the device 10. This is, in particular, advantageous when the device 10 comprises a displaceable fragile component—notably a flexible display attached to the parts 2, 4.

Figure 1B:
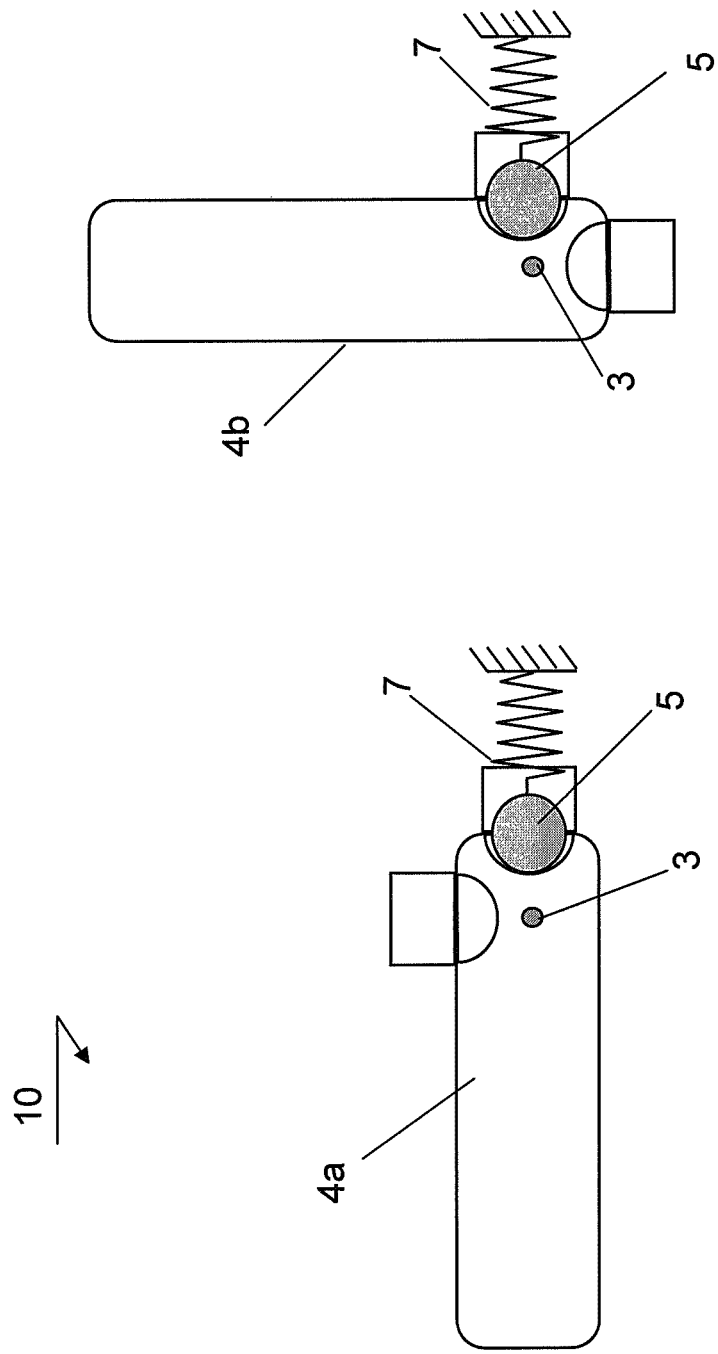

A schematic equivalent mechanical scheme of the device 10 shown in FIG. 1a is depicted in FIG. 1b. It is seen that the part 4a may have two different mechanically stable positions (schematically shown as horizontal 4a and vertical 4b), said part being rotatable around the hinge 3. The elastic locking unit 5 may thus be considered to be equivalent to an elastic spring 7, which is arranged to store potential energy when locked or open and to release said energy when being transitioned to another state.

Figure 2A:
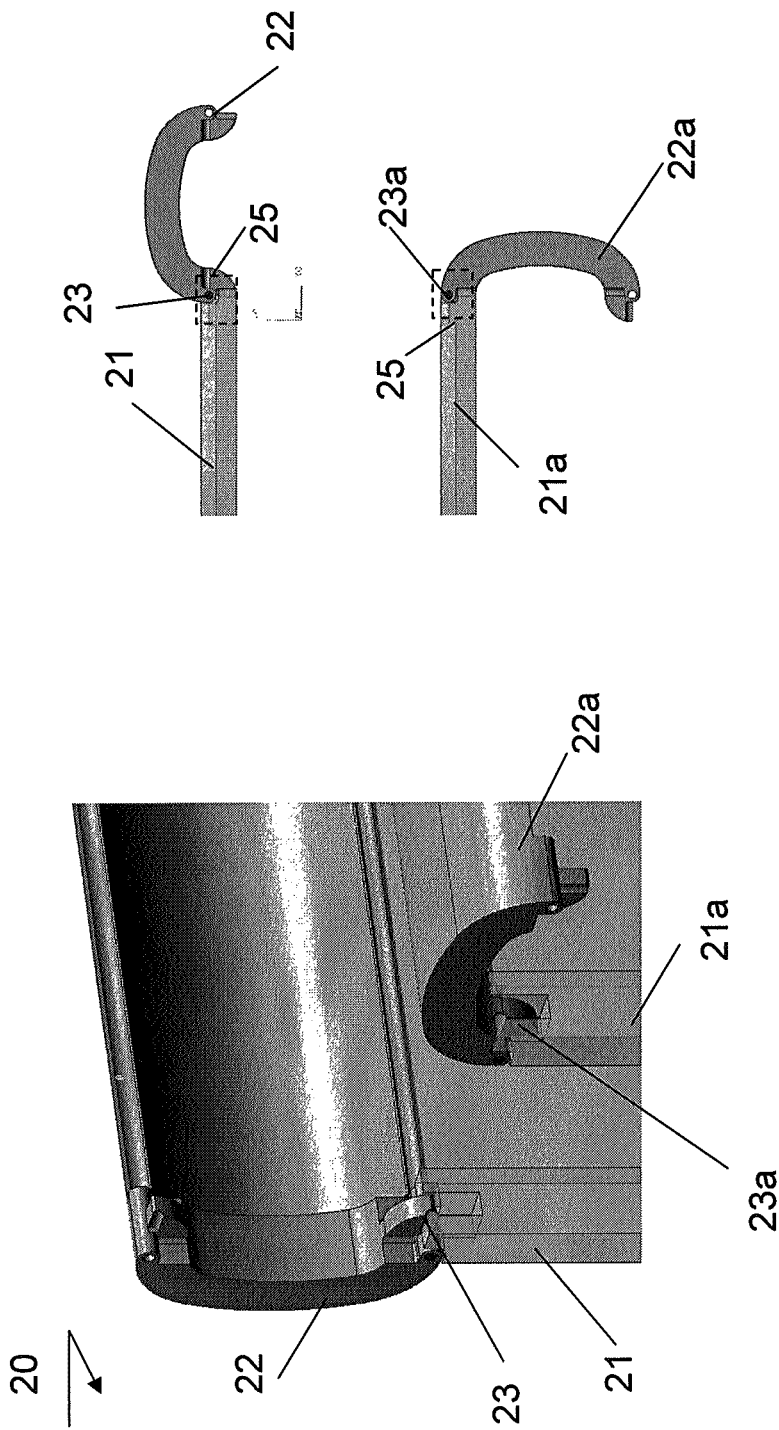
FIG. 2a presents a schematic view of a further embodiment of the device according to the invention comprising an elastic locking unit.

FIG. 2a presents a schematic view of a further embodiment of the device according to the invention comprising an elastic locking unit. Device 20, according to an exemplary embodiment of the invention, comprises two mutually displaceable parts which are moved between the first mechanically stable position 21, 22, notably "open" and a second mechanically stable position 21a, 22a, notably "closed". It shall be appreciated that other positions than "open" and "closed" are contemplated as well. For example a first viewing position and a second viewing position are also contemplated. The displaceable parts rotate about a hinge 23, 23a. Preferably, the hinge 23, 23a is arranged to cooperate with an elastic material 25.

Figure 2B:
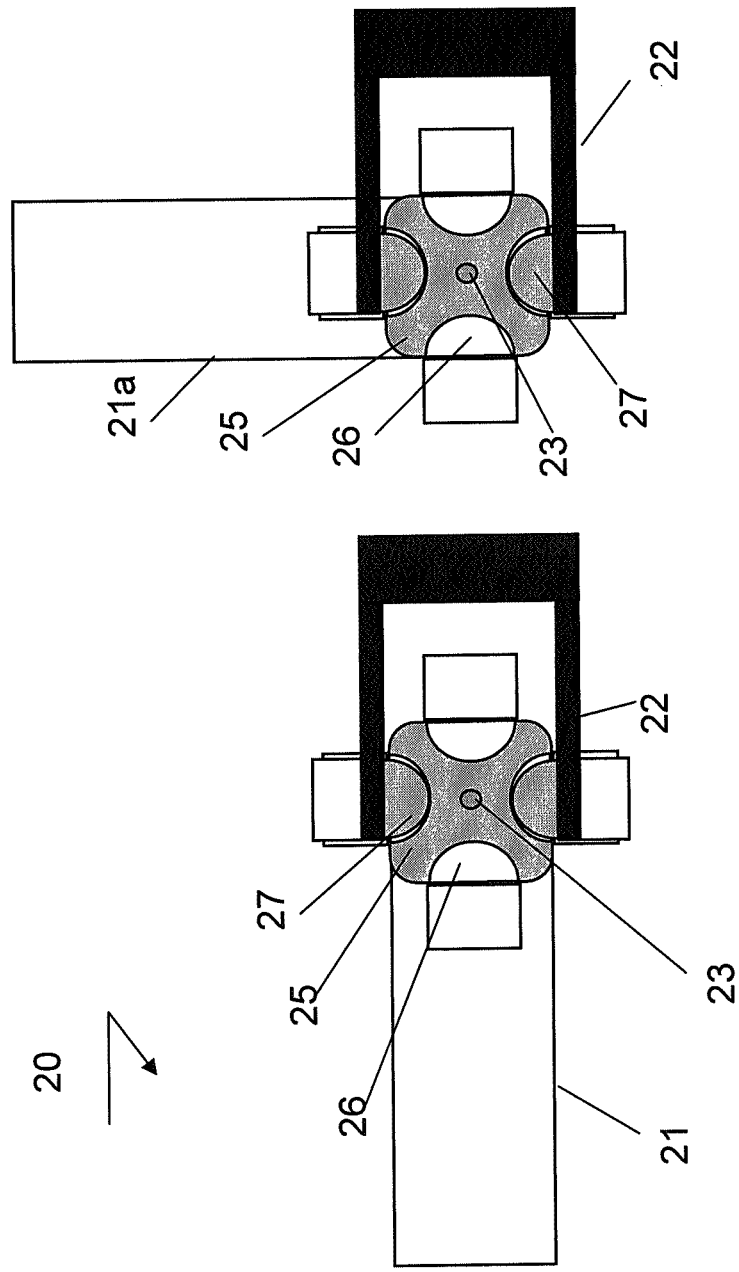

FIG. 2b presents a further schematic view of the device of FIG. 2a. The elastic material 25, notably rubber or the like is arranged to cooperate with suitable projections 27, which are arranged for locking the displaceable parts 21, 22 in the first mechanically stable position, for example when the part 21 is horizontal, and for locking the displaceable parts 21, 22 in a second mechanically stable position, for example when the part 21a is vertical. It is noted that the horizontal/vertical orientation referred to in FIGS. 1b and 2b is used merely for illustrative purposes and should not be construed in a limitative way. It is further noted that device 20, due to the elastic locking means cooperating with the mechanism 26, 27 for transitioning the parts 21, 22 between the first and the second mechanically stable position, substantially reduces mechanical shock induced to the parts 21, 22 upon such transition. This feature is of particular advantage when a fragile component of the device, like a flexible display or the like is to be supported by either or both parts 21, 22.

Figure 3:
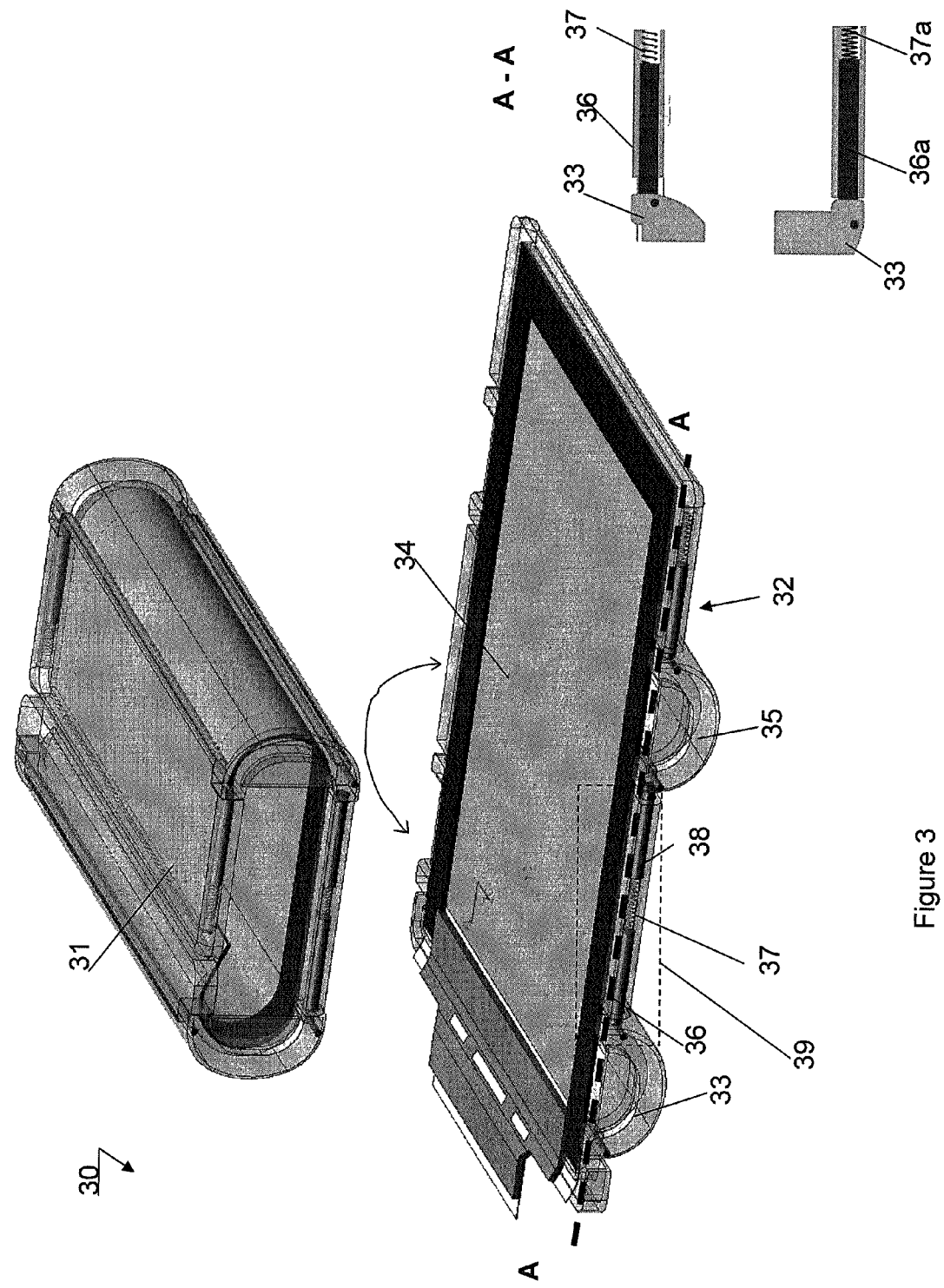
FIG. 3 presents several schematic views of an embodiment of the device according to the invention comprising a driving module.

FIG. 3 presents a schematic view of an embodiment of the device according to the invention comprising a driving module. Device 30, notably a mobile phone, an organizer, a palmtop computer, or the like, comprises a cover which is arranged to be movable between the first mechanically stable position 31 (closed) and a second mechanically stable position 32 (open). It is noted that the first mechanically stable position and the second mechanically stable position may also refer to a first viewing position and a second viewing position. The cover 32 is potentially foldable—as schematically shown by an arrow. The cover further comprises a mechanism 33, 35 (hinges) arranged for enabling a suitable transition between said mechanically stable positions. The mechanism 33, 35 is arranged with a module 39 for driving the hinges 33, 35 from an intermediate position to a first or a second mechanically stable position. The module 39 comprises a spring 37 which is compressible for one mechanically stable position and relaxable for the second mechanically stable position. Alternatively, the spring may be compressible for any or both the mechanically stable positions and be relaxable during a transition between the mechanically stable positions. Still alternatively, the spring may be relaxable for the first mechanically stable position and for the second mechanically stable position, and to be compressible during a transition from a mechanically stable position to the other mechanically stable position. Preferably, the spring 37 cooperates with one or more bars 36, 38 which add to compressive action. At a right hand side of FIG. 3 a schematic depiction of a cross-section of the device 30 along the line A-A is shown. The hinge 33 is arranged to cooperate with the bar 36 and the spring, which may be relaxed for the first mechanically stable position 37a and for the second mechanically stable position 37 and which is compressible during a transition between the first mechanically stable position and the second mechanically stable position. Preferably, the released energy is parallel to a direction of the unfolding of the cover 32. The spring is, for example, compressed for the open state of the cover 32, thereby ensuring that the cover 32 is substantially oriented in one plane, which may be advantageous in cases where the device 30 is arranged with a fragile component 34—notably a flexible display.

Figure 4:
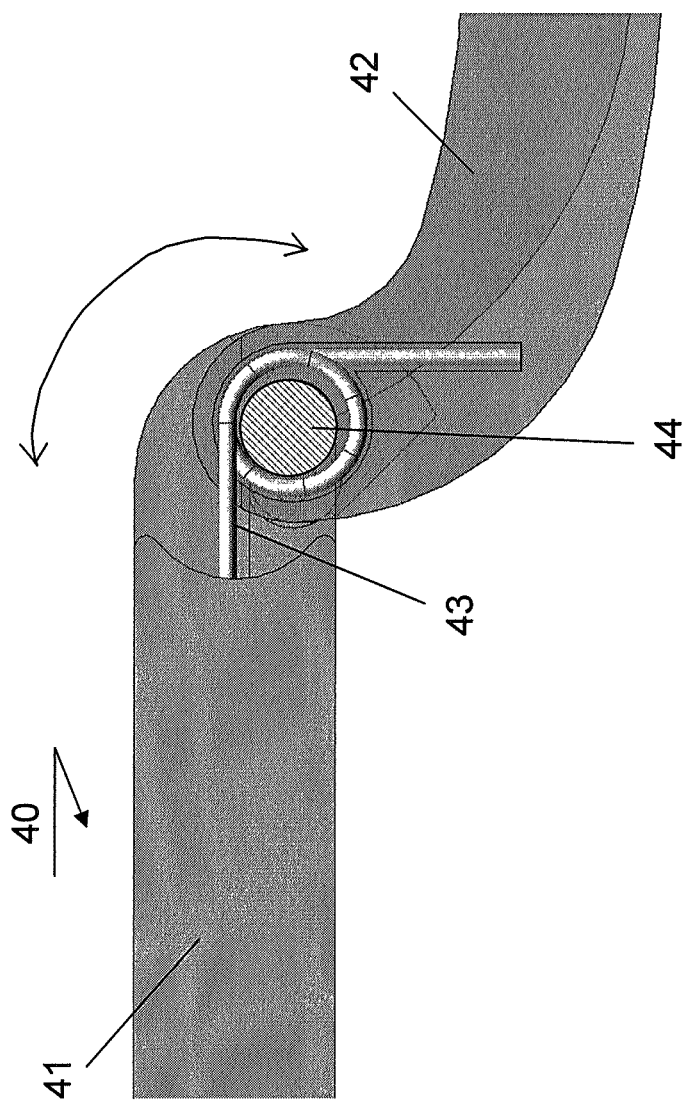
FIG. 4 presents a schematic view of a further embodiment of the device according to the invention comprising a driving module.

FIG. 4 presents a schematic view of a further embodiment of the device according to the invention comprising a driving module. In this particular embodiment of the device 40 the displaceable parts 41, 42 are pivotable about a hinge 44. The part 42 may be arranged to support a flexible display (not shown) of the electronic device 40. In accordance with the invention, the hinge 44 is arranged to cooperate with the elastic locking means 43, it being a torsion spring, for example. The parts 41, 42 are displaceable with respect to each other as is schematically shown by the arrow. When using the torsion spring 43 it is possible that a substantial amount of potential (elastic) energy is stored around the hinge 44 when the torsion spring is compressed. Such compression is achieved, for example, when the device 40 is closed so that the parts 41, 42 abut each other. The stored potential energy is used when the device 40 is opened—the torsion spring 43 releasing the energy and a smooth transition from the first mechanically stable position to a second mechanically stable position is enabled. This particular illustrative embodiment presents an easy means for enabling a smooth transition thereby minimizing possible mechanical shock to a fragile structure, such as a flexible display (not shown) attached to the parts 41 or 42, or both.

Figure 5:
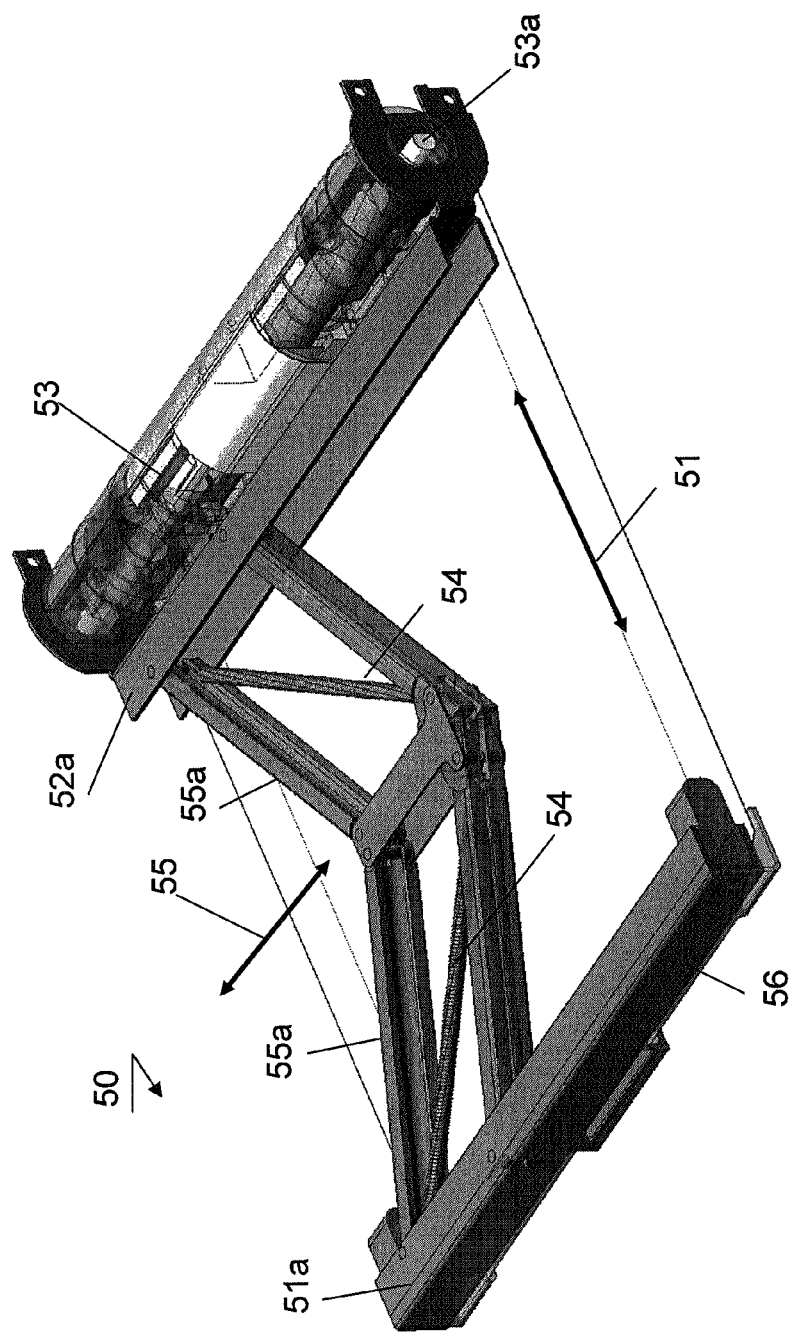
FIG. 5 presents a schematic view of a still further embodiment of the device according to the invention comprising a driving module.

FIG. 5 presents a schematic view of a still further embodiment of the device according to the invention comprising a driving module. In this particular embodiment a suitable fragile structure, notably a flexible display or the like, is not shown for clarity reasons. Such flexible display, by way of example, is rolled over a suitable roller 53, which can be rotated about a shaft 53a. Device 50 comprises a mechanism 51a, 52a arranged for transitioning the flexible display between a first mechanically stable position and a second mechanically stable position. The mechanism 51a, 52a may be implemented as a per se known bi-stable frame 56, arms of which are moved in the direction shown by the arrow 51. The frame comprises a hinged bar 55a, which is displaceable in the direction indicated by the arrow 55. The frame 56 has two mechanically stable positions, namely a closed position wherein the arms 51a, 52a substantially abut each other and a fully open position, wherein the arms 51a, 52a are arranged furthermost from each other, the bar 55a being completely straightened. In accordance to the invention the device 50 comprises an elastic locking unit. A tension spring 54 may be used as such locking unit. Furthermore, the tension spring 54 may have a dual function wherein the spring is conceived to store suitable amount of elastic energy when the frame 56 is in the first or in the second mechanically table position and to release the said energy when the frame is being transitioned to another mechanically stable position. Preferably, the fragile structure, notably the flexible display, is wound about the roller 53 by action of a tension spring driving the roller to rotate and to retract the fragile structure, which can be achieved when the torsion spring is arranged with some pre-tension. The tension spring 54 in the frame 56 may be arranged to cooperate with the torsion spring of the roller 53. The interaction between these two springs improves the accuracy of the bi-stable positioning of the frame 56, whereby it is ensured that the fragile structure, notably the flexible display, is kept flat when in the extended position. This feature reduces risk of damage to the flexible display due to undesired bending.

Figure 6:
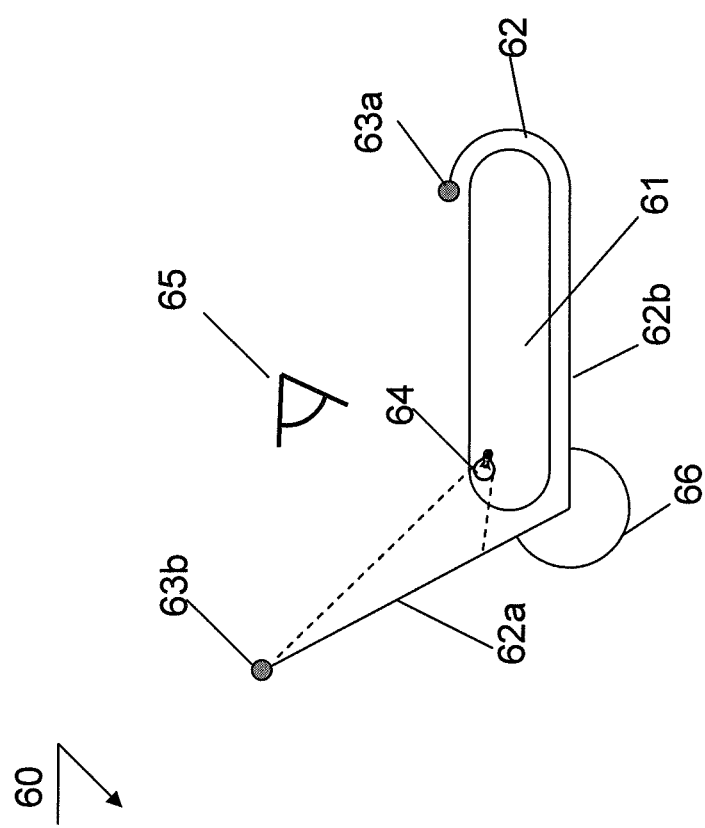
FIG. 6 presents a schematic view of a further embodiment of the device provided with a wrappable display.

FIG. 6 presents a schematic view of a further embodiment of the device provided with a flexible display 62 which is arranged to be wrapped about a housing 61. The flexible display 62 cooperates with a hinge 66 enabling a first mechanically stable position and a second mechanically stable position to the display 62. The arrangement 66, notably a hinge, is provided to enable a plurality of angulations of a portion of the display 62a with respect to the other portion of the display 62b and/or the housing 61. Preferably, the device 60 further comprises an illumination unit 64, notably a lamp which is arranged to illuminate a portion of the display which is positioned substantially adjacent the illumination unit 64. This feature is particularly useful for viewing purposes of the display 62, notably from a direction 65. The hinges may be implemented in accordance with an embodiment discussed with reference to FIG. 2b.

Figure 7:
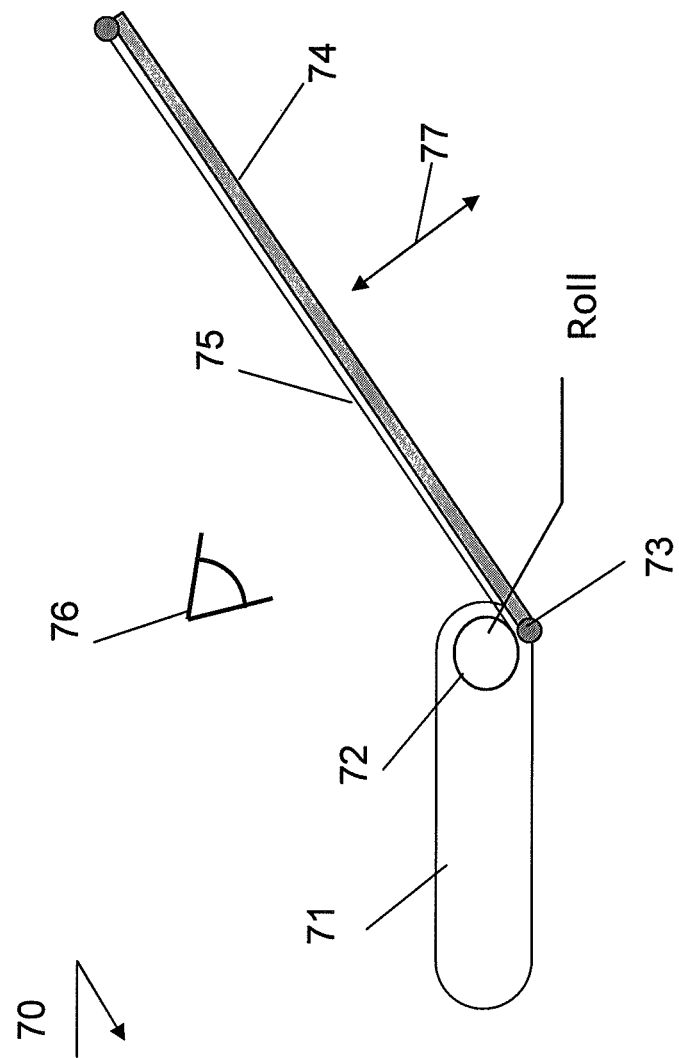
FIG. 7 presents a schematic view of an embodiment of the device provided with a rollable display.

FIG. 7 presents a schematic view of an embodiment of the device provided with a rollable display. The device 70 comprises a housing 71 provided with a suitable roller 72 whereon the flexible electronic display 75 is conceived to be wound. The mechanism 74 is arranged to extend the rollable display 75 from the housing 71. The housing 73 preferably comprises a hinge 73 for enabling a suitable plurality of mechanically stable positions of the display in a direction 77. Examples of suitable hinges are discussed with reference to FIG. 2b. Viewing of the display is enabled from the direction 76.

In order to implement viewing of the display 75, a suitable light source is provided. The light source may be externally arranged, for example on a housing 71. In a preferred embodiment the light source is arranged to emit light onto the display 75 under an oblique angle. This has an advantage that a smoothly illuminated viewing area on the display 75 is provided.

Figure 8:
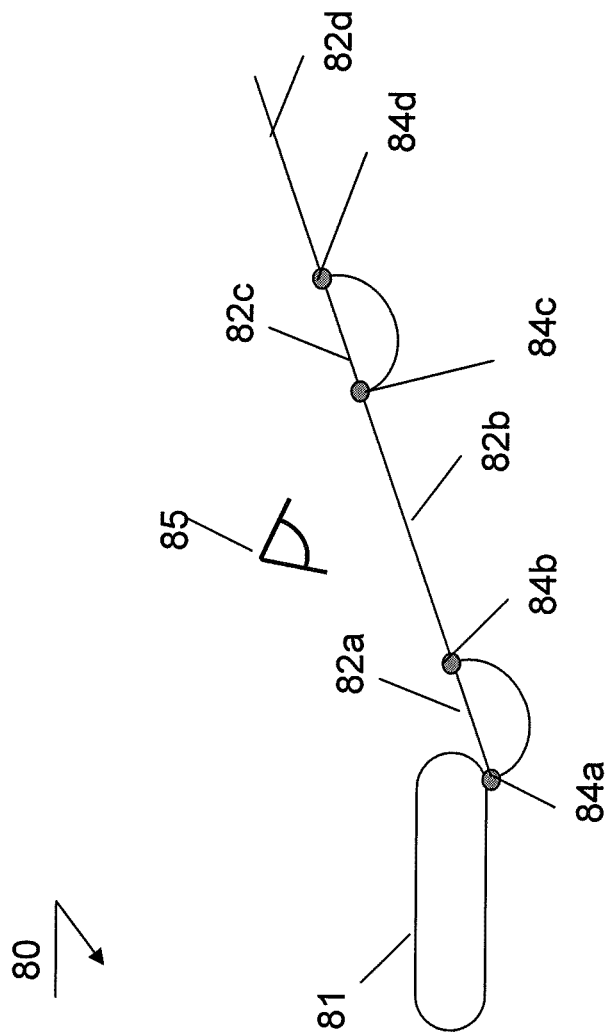
FIG. 8 presents a schematic view of a further embodiment of the device provided with a plurality of hinges.
Figure 9:
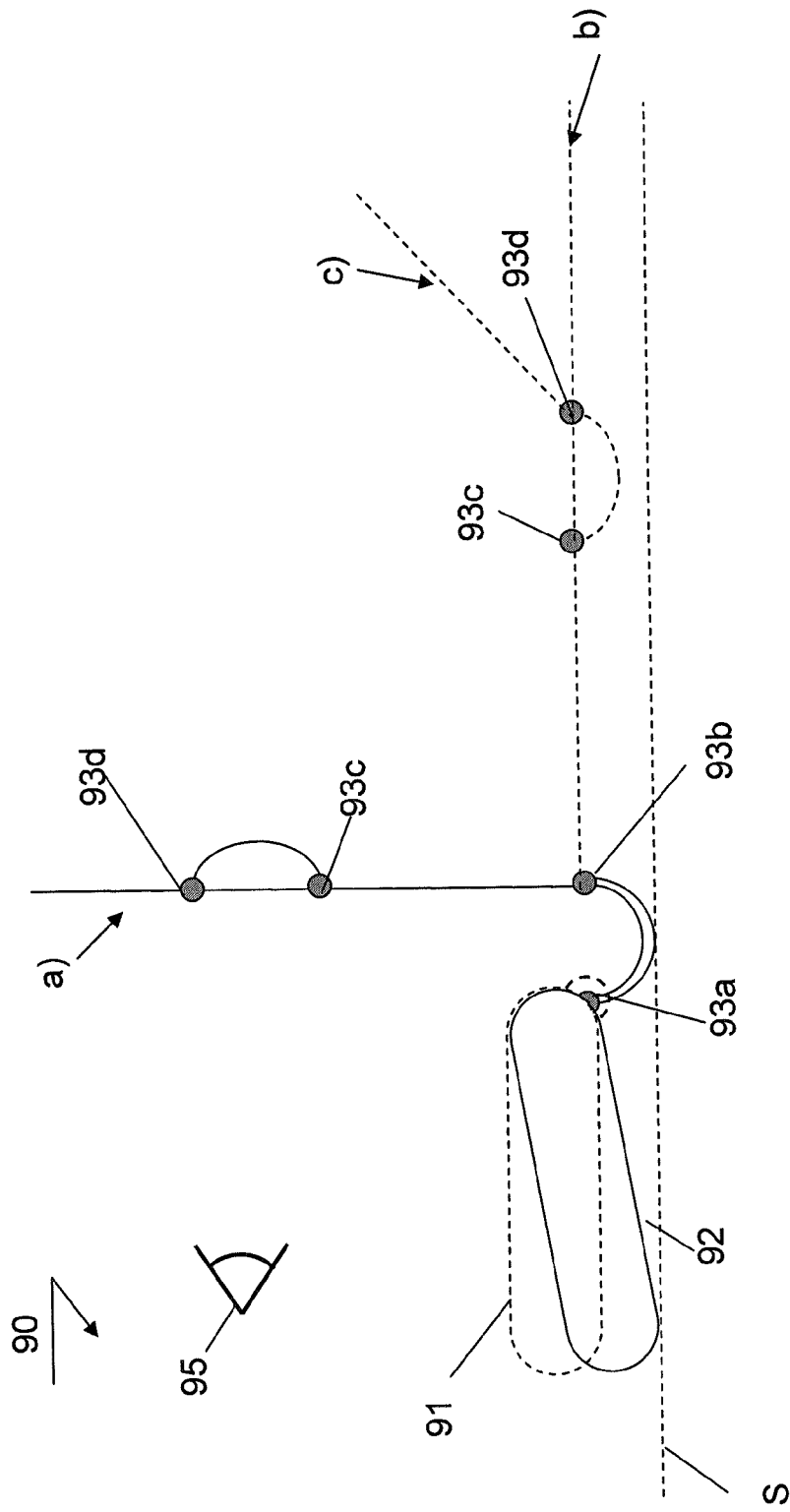
FIG. 9 presents a schematic view of a still further embodiment of the device provided with a plurality of hinges.

FIG. 8 presents a schematic view of a further embodiment of the electronic device according to the invention, provided with a plurality of hinges. The device 80 comprises a housing 81 and a display having portions 82a,82b,82c and 82d, said portions being accommodated between respective hinges 84a,84b,84c, and 84d. The display can be viewed from the direction 85. The hinges can be operated independently from each other, as is shown in FIG. 9. The hinges may be implemented in accordance with an embodiment discussed with reference to FIG. 2b thereby enabling a plurality of angulations of the flexible display (or portions thereof) with respect to the housing 81.

FIG. 9 presents a schematic view of a still further embodiment of the device provided with a plurality of hinges. The device 90 comprises a housing 91, a suitable plurality of hinges 93a,93b,93c, and 93d, which may be operated individually to displace respective portions of the display independently from each other, as is schematically indicated by a), b), or c). The display is viewable from a direction 95. The hinges are implemented, for example, in accordance with an embodiment discussed with reference to FIG. 2b. The housing 91 may also be arranged in a suitable plurality of mechanically stable positions. For example, the housing 91 is tilted to a position 92 so that the housing and an area between the hinges 93a and 93b contacts a suitable surface S. Preferably, the surface S is oriented horizontally. By such tilting of the housing, an easy data input using a suitable user interface is enabled.

Figure 10:
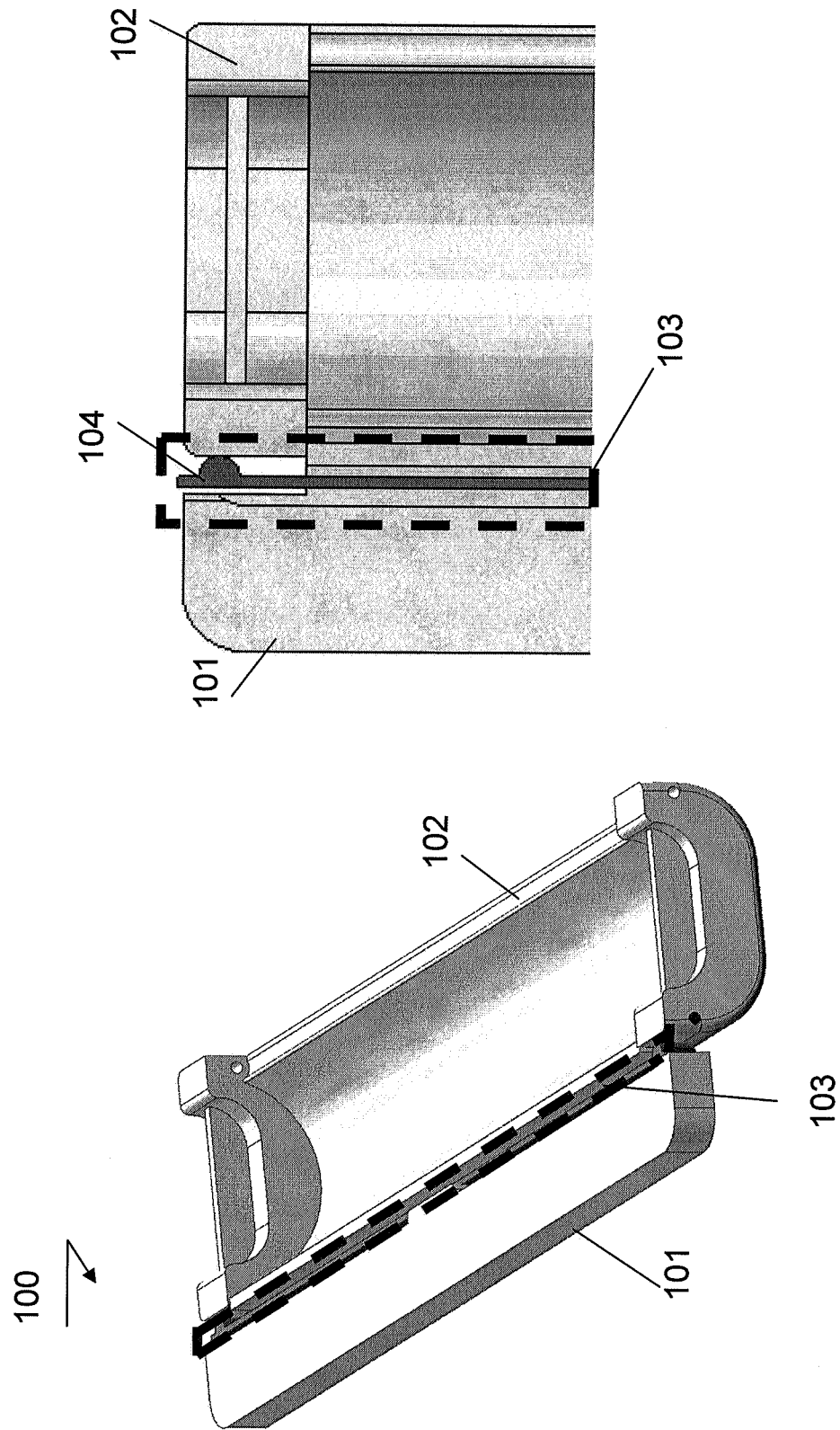
FIG. 10 presents a schematic view of a still further embodiment of the device according to the invention.

FIG. 10 presents a schematic view of a still further embodiment of the electronic device according to the invention. The device 100 comprises a portion 101 being displaceable with respect to the portion 102. An area 103 is used to arrange a suitable elastic means, notably a spring 104 for enabling a transition from a first mechanically stable position of the portion 101 to a second mechanically stable position of the portion 101. For example, the first mechanically stable position corresponds to an open state of the device 100, whereas the second mechanically stable position corresponds to a closed state of the device. The first mechanically stable position and the second mechanically stable position may also correspond to a first viewing position and a second viewing position. The function of the elastic means 104 is further similar to that discussed with reference to any one of the FIG. 1a, 1b or 3.

Figure 11:
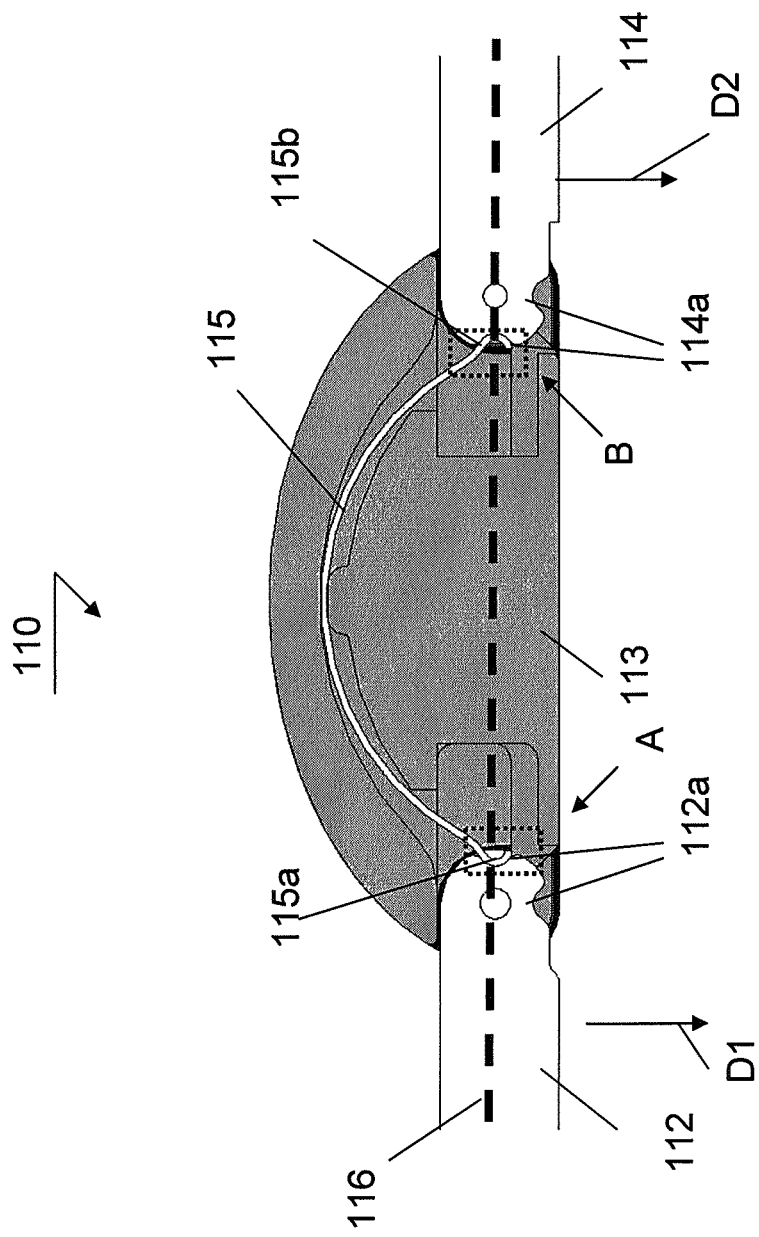
FIG. 11 presents a schematic view of a still further embodiment of the device according tot the invention.

FIG. 11 presents a schematic view of a further embodiment of the device according to the invention. The device 110 comprises a first displaceable portion 112 and a second displaceable portion 114 interconnected by a central portion 113. The first portion 112 and the second portion 114 are displaceable about the central portion 113 in direction indicated by arrows D1, D2. A flexible display 116 of the electronic device 110 is supported by at least the portions 112 and 114, and, preferably also by the central portion 113. In order to enable the first mechanically stable position and the second mechanically stable position for the display with respect to housing (not shown) of the device 110, in areas of the first portion and the second portion cooperating with the central portions a suitable plurality of recesses 112a,114a is provided. It will be appreciated that although in FIG. 11 schematically a pair of recesses per terminal area is indicated any suitable plurality of recessed may be provided. In the latter case a plurality of viewing positions of the display may be enabled. The recesses 112a,114a are constructed to cooperate with an elastic body 115, for example with an elastic spring. The spring may be provided as an elastic stripe of a suitable material, for example metal. In the mechanically stable positions the ends of the spring 115a,115b fall into recess 112a, 114a,as is indicated in views A and B.

Figure 12:
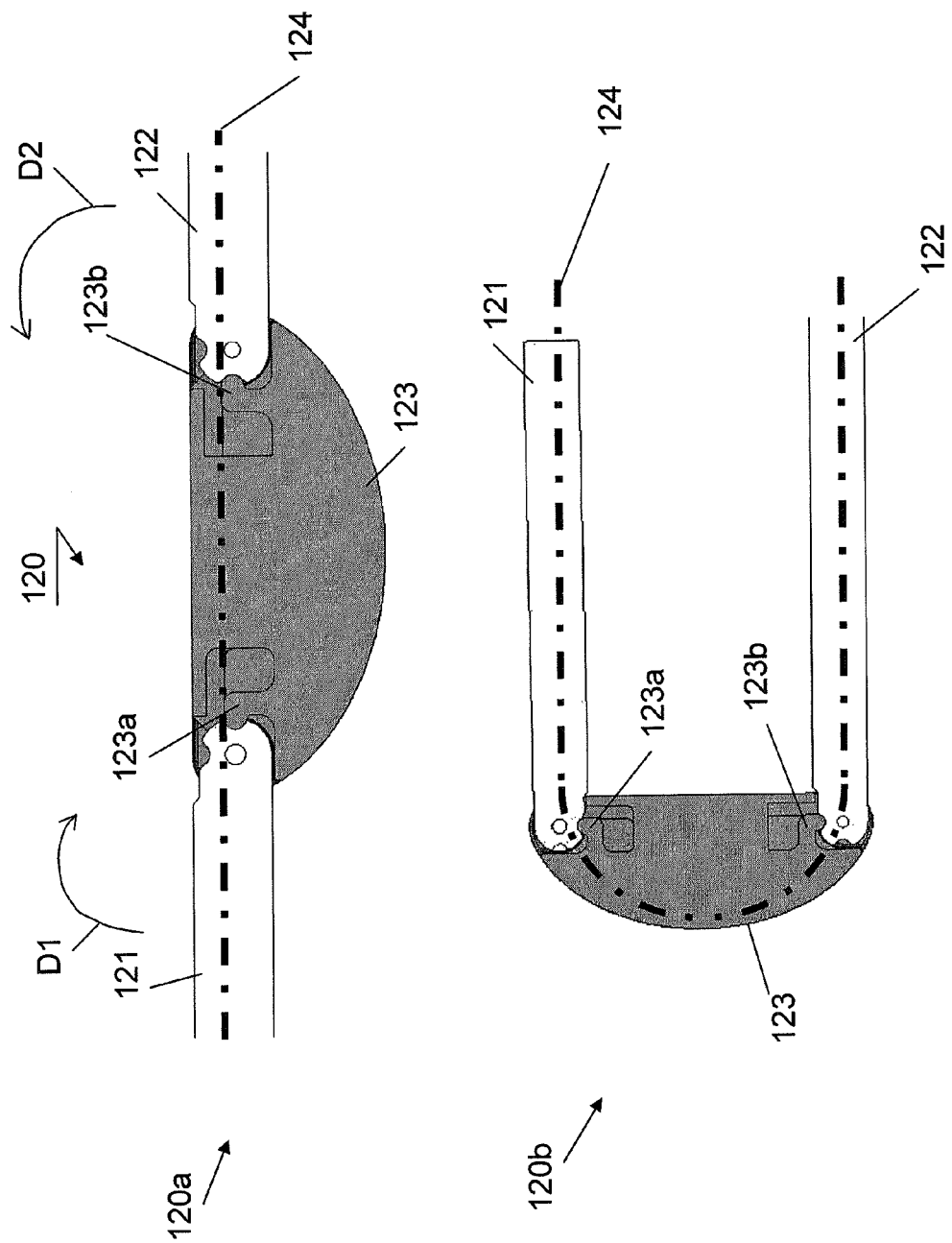
FIG. 12 presents a schematic view of a still further embodiment of the device according tot the invention.

FIG. 12 presents a schematic view of a still further embodiment of the device according tot the invention. The device 120 comprises a first portion 121, a second portion 122 and a central portion 123 cooperating with the first portion 121 and the second portion 122. The display 124 may be at least partially supported by the first portion 121, the second portion 122 and the central portion 123. In order to enable a first mechanically stable position and at least a second mechanically stable position incurring different angulations of a flexible display 124 with respect to the housing (not shown) of the device 120, the central portion may be provided with elastic rocker arms 123a,123b conceived to cooperate with recesses in the first portion 121 and the second portion 122. The first portion 121 and the second portion 122 are displaceable with respect to the central portion 123 as is schematically indicated by arrows D1 and D2. View 120a schematically shows a configuration wherein the display 124 is flat and wherein a first mechanically stable position of the display 124 is reached. View 120b schematically shows a configuration wherein the display 124 is bended and wherein a second mechanically stable position of the display 124 is reached, having a different angulation with respect to the housing of the device 120. Practically, the central portion, discussed with reference to FIG. 11 and FIG. 12 may form part or be received in the housing, which means that a different angulation of the display with respect to the central portion directly indicates a different angulation of the display with respect to the housing. Suitably, different display angulations are used for different viewing modes or for different interacting modes, like typing, drawing, or undertaking actions related to touch-functionality.

It will be appreciated that although specific embodiments of the electronic device according to the invention are discussed separately for clarity purposes, interchangeability of compatible features discussed with reference to isolated figures is envisaged. While specific embodiments have been described above, it will be appreciated that the invention may be practiced otherwise than as described. The descriptions above are intended to be illustrative, not limiting. Thus, it will be apparent to one skilled in the art that modifications may be made to the invention as described in the foregoing without departing from the scope of the claims set out below.

The invention claimed is:

1. An electronic device comprising:
    a housing;
    a flexible display adapted to be displaceable with respect to the housing, said flexible display having a first mechanically stable position and a second mechanically stable position, wherein said first mechanically stable position and said second mechanically stable position are enabled for different angulations of the flexible display or portions of the flexible display with respect to the housing; and
    a mechanism arranged for enabling a transition between said first mechanically stable position and said second mechanically stable position, comprising:
        a first portion having a first hinge point, a second hinge point, and a rigid arched segment disposed between said first and second hinge points; and
        a second portion hinged to each of said first and second hinge points for facilitating said first mechanically stable position and said second mechanically stable position of the flexible display,
        arranged such that during said first mechanically stable position of the flexible display, a portion of said flexible display is partially stored in said arched segment of the first portion and forms a curvilinear configuration, and during said second mechanically stable position of said flexible display, said portion of the flexible display leaves said arched segment and forms a planar configuration supported by said second portions.

2. The device according to claim 1, wherein said mechanism is arranged for enabling said flexible display having an intermediate position, between said first mechanically stable position and said second mechanically stable position, and said mechanism is arranged to cooperate with an elastic locking unit so as to keep said flexible display in a stable arrangement.

3. The device according to claim 2, wherein the flexible display is arranged to be pivoted with respect to the housing, said display or housing comprising a recess, and the elastic locking unit comprising an elastic material arranged to be compressed at least to partially fill the recess.

4. The device according to claim 1, wherein the flexible display is arranged to be pivoted about a shaft, the mechanism being arranged with a spring cooperating with the shaft and being arranged to enable the transition between the first mechanically stable position and the second mechanically stable position.

5. The device according to claim 4, wherein the spring is a torsion spring.

6. The device according to claim 1, wherein the flexible display is slidably arranged with respect to the housing using a frame, the module comprising a tension spring cooperating with the frame.

7. The device according to claim 1, wherein the flexible display is adapted to be moved between an at least partially retracted state and an at least partially extended state, said partially retracted state and said partially extended state being implemented either for the first mechanically stable position or for the second mechanically stable position.

8. The device according to claim 1, wherein at least one mechanically stable position is arranged for enabling data input into the device.

9. The device according to claim 1, wherein the device further comprises an illumination unit arranged to cooperate with the flexible display arranged in a first mechanically stable position or in a second mechanically stable position.

10. The device according to claim 1, wherein the first viewing position or the second viewing position is arranged to enable at least a partial viewing mode.

* * * * *